(12) United States Patent
Cho et al.

(10) Patent No.: US 7,553,580 B2
(45) Date of Patent: Jun. 30, 2009

(54) ELECTRODE SUBSTRATE FOR A FUEL CELL, A METHOD FOR PREPARING THE SAME, AND A MEMBRANE-ELECTRODE ASSEMBLY COMPRISING THE SAME

(75) Inventors: Sung-Yong Cho, Suwon-si (KR); Jong-Ki Lee, Suwon-si (KR); Yeong-Chan Eun, Suwon-si (KR); Ho-Jin Kweon, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 330 days.

(21) Appl. No.: 11/431,977

(22) Filed: May 10, 2006

(65) Prior Publication Data
US 2006/0257641 A1    Nov. 16, 2006

(30) Foreign Application Priority Data
May 11, 2005    (KR) .............. 10-2005-0039269

(51) Int. Cl.
*H01M 4/86* (2006.01)
(52) U.S. Cl. .................. 429/44; 429/30; 429/33; 429/34; 429/35; 429/40; 204/283; 204/252; 204/294
(58) Field of Classification Search .......... 429/30, 429/33, 34, 35, 36, 38, 39, 40, 44; 204/283, 204/294, 252
See application file for complete search history.

(56) References Cited

U.S. PATENT DOCUMENTS

| | | | | |
|---|---|---|---|---|
| 5,460,896 | A | 10/1995 | Takada et al. | |
| 6,127,059 | A * | 10/2000 | Kato | ............ 429/40 |
| 6,733,915 | B2 * | 5/2004 | Barton et al. | ............ 429/34 |
| 6,991,870 | B2 | 1/2006 | Yasumoto et al. | |
| 2002/0146616 | A1 | 10/2002 | Yasuo et al. | |
| 2003/0157396 | A1 | 8/2003 | Beckmann et al. | |
| 2004/0209136 | A1 | 10/2004 | Ren et al. | |

FOREIGN PATENT DOCUMENTS

| | | |
|---|---|---|
| CN | 1305647 A | 7/2001 |
| JP | 2003-96229 | 4/2003 |
| JP | 2003-109629 | 4/2003 |

(Continued)

OTHER PUBLICATIONS

Korean Patent Abstracts for Publication No. 1020020032021 A; Date of Publication of Application May 3, 2002 in the name of Chan Lim.
Patent Abstracts of Japan for Publication No. 2003-109629; Date of Publication of Application Apr. 11, 2003 in the name of Masao Yamamoto, et al.

(Continued)

*Primary Examiner*—Bruce F Bell
(74) *Attorney, Agent, or Firm*—Christie Parker & Hale LLP

(57) ABSTRACT

An electrode substrate for a fuel cell including a diffusion layer, a first microporous layer that embeds into the diffusion layer, with the first microporous layer having a thickness in the range of 10 to 30 μm, and a second microporous layer that forms a boundary with the diffusion layer on the surface of the first microporous layer. The electrode substrate has improved performance such as increased diffusion properties of a fuel or an oxidant, increased properties of releasing moisture, and enhanced electron conductivity.

10 Claims, 3 Drawing Sheets

FOREIGN PATENT DOCUMENTS

| | | |
|---|---|---|
| KR | 2002-0032021 | 5/2002 |
| KR | 2002-0093107 | 12/2002 |
| WO | WO 02/073721 A1 | 9/2002 |

OTHER PUBLICATIONS

Patent Abstracts of Japan, Publication No. 2003-096229, dated Apr. 3, 2003, in the name of Shigeo Nishikawa et al.

* cited by examiner

ELECTRODE SUBSTRATE FOR A FUEL CELL, A METHOD FOR PREPARING THE SAME, AND A MEMBRANE-ELECTRODE ASSEMBLY COMPRISING THE SAME

CROSS-REFERENCE TO RELATED APPLICATION

This application claims priority to and the benefit of Korean Patent Application No. 10-2005-0039269 filed in the Korean Intellectual Property Office on May 11, 2005, the entire content of which is incorporated herein by reference.

FIELD OF THE INVENTION

The invention relates to an electrode substrate for a fuel cell, a method of preparing the electrode substrate for a fuel cell, and a membrane-electrode assembly including the electrode substrate for a fuel cell. More particularly, the invention relates to an electrode substrate for a fuel cell that facilitates diffusion of a fuel and an oxidant and the removal of moisture and possesses excellent electron conductivity. The invention is also directed to a method of preparing the electrode substrate for a fuel cell, and a membrane-electrode assembly including the electrode substrate for a fuel cell.

BACKGROUND

A fuel cell is a power generation system for producing electrical energy through the electrochemical redox reaction of an oxidant and a fuel such as hydrogen, or a hydrocarbon-based material such as methanol, ethanol, natural gas, and the like.

The fuel cell can be classified as a phosphoric acid type, a molten carbonate type, a solid oxide type, a polymer electrolyte type, or an alkaline type, depending on the kind of electrolyte used. Although each of these different types of fuel cells basically operates in accordance with the same principles, they may differ from one another in the type of fuel, operating temperature, catalyst, and/or the electrolyte used.

Recently, polymer electrolyte membrane fuel cells (PEMFCS) have been developed. They have power characteristics that are superior to conventional fuel cells, as well as lower operating temperatures and faster start and response characteristics. Because of this, PEMFCs have a wide range of applications such as mobile power sources for automobiles, distributed power sources for houses and public buildings, and for small electric sources for electronic devices.

A PEMFC is essentially composed of an electricity generating element, a reformer, and a fuel supplier. The electricity generating element forms a body of the PEMFC, and the fuel supplier provides the fuel stored in the fuel tank to the reformer. The reformer reforms the fuel to generate the hydrogen gas and supplies the hydrogen gas to the electricity generating element. Accordingly, in the PEMFC, fuel stored in the fuel tank is pumped to the reformer through a fuel pump and then the reformer reforms the fuel to generate hydrogen gas. The hydrogen gas and an oxidant are supplied to an electricity generating element through respective pumps. The electricity generating element generates electrical energy through the electrochemical reaction of the hydrogen gas and the oxidant.

The fuel cell may be a direct oxidation fuel cell (DOFC) in which liquid fuel is directly introduced to the electricity generating element. The direct oxidation fuel cell can omit the reformer which is essential for the polymer electrolyte fuel cell. Direct oxidation fuel cells may include a direct methanol fuel cell.

According to the above-mentioned fuel cell system, the electricity generating element for substantially generating the electricity has a structure in which several or many unit cells consisting of a membrane electrode assembly (MEA) and a separator (or referred to as a "bipolar plate") are stacked. The membrane electrode assembly is composed of an anode (referred to as a "fuel electrode" or "oxidation electrode") and a cathode (referred as an "air electrode" or a "reduction electrode") separated by the polymer electrolyte membrane. The separators work as passageways for supplying the fuel and the oxidant required for the reaction to the anode and the cathode, respectively, and also work as conductors for serially connecting the anode and the cathode in the membrane-electrode assembly.

The electrochemical oxidation reaction of the fuel occurs at the anode, and the electrochemical reduction reaction of oxygen occurs at the cathode. Due to movement of the electrons generated by the reactions, electricity, heat, and water can be collectively produced.

The above information disclosed in this Background section is only for enhancement of understanding of the background of the invention, and therefore it should be understood that the above information may contain information that does not form the prior art that is already known in this country to a person or ordinary skill in the art.

SUMMARY OF THE INVENTION

In general, a fuel cell includes an anode and a cathode, which each include an electrode substrate and a catalyst layer. A conventional electrode substrate includes a diffusion layer such as a carbon paper. However, the diffusion layer cannot sufficiently diffuse a fuel or an oxidant.

Therefore, the invention provides an electrode substrate with improved fuel and oxidant diffusion performance by adding a micro-porous layer (MPL) on the diffusion layer.

However, when the microporous layer is simply coated on the diffusion layer, the microporous layer increases resistance on the interface with the diffusion layer, which impedes conduction of electrons, thereby deteriorating the performance of a fuel cell.

In order to solve this problem, one embodiment of the invention provides an electrode substrate for a fuel cell having excellent fuel and oxidant diffusion performance, and low resistance on the interface between a diffusion layer and a microporous layer.

Another embodiment of the invention provides a method of fabricating the electrode substrate for a fuel cell.

Yet another embodiment of the invention provides a membrane-electrode assembly for a fuel cell including the electrode substrate.

In one embodiment, the invention provides an electrode substrate for a fuel cell including a diffusion layer and a microporous layer. Herein, a portion of the microporous layer embeds into the diffusion layer.

In an embodiment, the invention also provides a method of preparing the electrode substrate for a fuel cell, including preparing a composition by mixing a carbon material which is formed of particles, a binder, and a solvent. The composition is coated on a diffusion layer; and the coated composition is fired, thereby forming a microporous layer on the diffusion layer.

In one embodiment, the invention provides a membrane-electrode assembly for a fuel cell including an anode, which includes the electrode substrate and a catalyst layer formed on a microporous layer of the electrode substrate; a cathode, which includes the electrode substrate and a catalyst layer formed on a microporous layer of the electrode substrate; and a polymer electrolyte membrane positioned between the anode and cathode and contacting both catalyst layers thereof.

DETAILED DESCRIPTION

Figure 1:
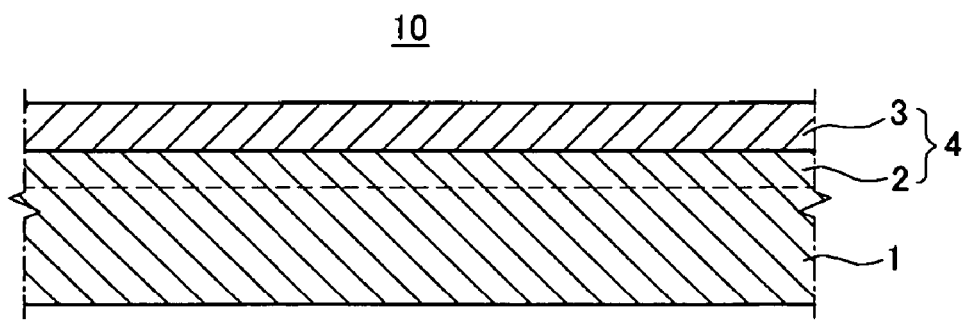
FIG. 1 is a cross-sectional view showing one embodiment of an electrode substrate for a fuel cell according to the invention.

As shown in FIG. 1, an electrode substrate 10 according to one embodiment of the invention includes a diffusion layer 1 and a microporous layer 4. The microporous layer 4 includes a first microporous layer 2 formed through internal invasion into the diffusion layer 1, and a second microporous layer 3 that forms a boundary with the diffusion layer 1 on the surface thereof. However, it is not necessary for the electrode substrate to be limited to the structure of FIG. 1.

In one embodiment, the first microporous layer 2 has a thickness in the range of 10 to 30 µm. When the first microporous layer has a thickness of less than 10 µm, a fuel or an oxidant can have increased transferring resistance due to interface resistance between the diffusion layer and the second microporous layer and the pore size differences of these two layers.

In one embodiment, the first microporous layer may have a thickness in the range of greater than or equal to about 25% of the entire thickness of the two microporous layers. In another embodiment, the first microporous layer may have a thickness in the range of about 25% to 80% of the entire thickness of the two microporous layers. When the first microporous layer has a thickness within the above ratios, resultant cell performance can be improved.

In one embodiment, the diffusion layer and the entire microporous layer (the first and second microporous layers) thickness can be appropriately regulated depending on the size and performance of a fuel cell. In an embodiment, the diffusion layer may have a thickness in the range of 200 to 280 µm, and the microporous layer may have a thickness in the range of 20 to 50 µm.

When the diffusion layer is less than 200 µm thick, an electrode substrate can have low mechanical strength, while when it is more than 280 µm thick, a fuel or an oxidant can have difficulty in diffusion, resulting in increasing mass transferring resistances. In addition, when the microporous layer is less than 20 µm thick, it has little effect on improving the diffusion performance of a fuel or an oxidant, while when it is more than 50 µm thick, it can have problems in diffusing a fuel or an oxidant and discharging water generated during the operation of a fuel cell.

According to an embodiment of the invention, an electrode substrate plays a role in diffusing a fuel or an oxidant and conducting electrons generated in a catalyst layer into a separator. The electrode substrate includes a diffusion layer and a microporous layer, which are formed of a carbon material having electron conductivity.

In one embodiment, the diffusion layer is a conductive substrate, for example, carbon papers, carbon cloth, carbon felt, or metal cloth (a porous film comprising metal cloth fiber or a metalized polymer fiber), but is not limited thereto.

In addition, in an embodiment, the microporous layer comprises a carbon material selected from the group consisting of graphite, carbon nanotubes (CNT), fullerene (C60), activated carbon, Vulcan, ketjen black, carbon black, and carbon nano horns.

In one embodiment, the microporous layer also can include a binder to increase attachment of the carbon materials, and the binder can include one selected from the group consisting of poly(perfluorosulfonic acid), poly(tetrafluoroethylene), and fluorinated ethylene-propylene.

In one embodiment, the binder is included in a ratio of 10 to 40 parts by weight based on 90 to 60 parts by weight of the carbon material, but it is not limited thereto.

According to an embodiment of the invention, an electrode substrate is fabricated by preparing a coating composition by mixing a carbon material, which is formed of particles, a binder, and a solvent; coating the composition on a diffusion layer of the electrode substrate; and forming a microporous layer thereon by firing the coated composition.

In one embodiment, the carbon material used to form the microporous layer can include at least one material selected from the group consisting of graphite, carbon nanotubes (CNT), fullerene (C60), activated carbon, Vulcan, ketjen black, carbon black, carbon nano horns, and combinations thereof.

In an embodiment, the binder can include at least one material selected from the group consisting of poly(perfluorosulfonic acid), poly(tetrafluoroethylene), fluorinated ethylene-propylene, and combinations thereof.

In one embodiment, the solvent used to prepare the coating composition can include at least one selected from the group consisting of isopropyl alcohol, N-propyl alcohol, ethanol, methanol, N-butyl acetate, and combinations thereof. However, the solvent is not necessarily limited thereto.

In one embodiment, the coating composition includes a solid content in a concentration in the range of 40 to 70 wt% of the entire weight of the composition. In an embodiment, the carbon material used to from a microporous layer is included in a ratio in the range of 20 to 40 wt% of the solid content. When the solid content has a concentration of less than 40 wt%, it is difficult for the carbon material therein to form a microporous layer because all the carbon material embeds into the diffusion layer, while when the solid content has a concentration of more than 70 wt%, it is difficult for the carbon material to embed into the diffusion layer, thereby deteriorating interface resistance effects.

In addition, when the carbon material is included in the solid content in an amount of less than 20%, it is hard to secure sufficient electroconductivity and diffusion properties of the reactant. On the other hand, a content with more than 40% of the carbon material can result in the deterioration of shape maintenance characteristics.

In one embodiment, the diffusion layer is formed of carbon paper, carbon cloth, carbon felt, or metal cloth (a porous film comprising metal cloth fiber or a metalized polymer fiber), and has a thickness in the range of 200 to 280 µm.

In an embodiment, the coating composition is formed as a slurry with a viscosity in the range of 1500 to 3000 cps. When the coating composition has a viscosity less than 1500 cps, carbon particles mostly flow down into a diffusion layer, failing to form a microporous layer, while when the coating composition has a viscosity of more than 3000 cps, it is difficult for the composition to embed into the diffusion layer.

According to an embodiment of the invention, a method of coating the coating composition has no particular limit but can include a common slurry coating method, including a coating method using a screen coater.

In addition, in one embodiment, the diffusion layer coated with the composition can have a vacuum formed at the uncoated side and can thereby be fixed. In an embodiment, the vacuum is formed using a screen of more than 200 mesh as a supporter for the diffusion layer.

In one embodiment, the coating composition is coated to have an entire thickness in the range of 20 to 50 µm. In an embodiment, the portion of the coating composition that is partially embedded into the diffusion layer, has an overall thickness in the range of 10 to 30 µm.

In one embodiment, the coated diffusion layer is fired in the range of 280 to 350° C. to obtain an electrode substrate for a fuel cell having a microporous layer.

Figure 2:
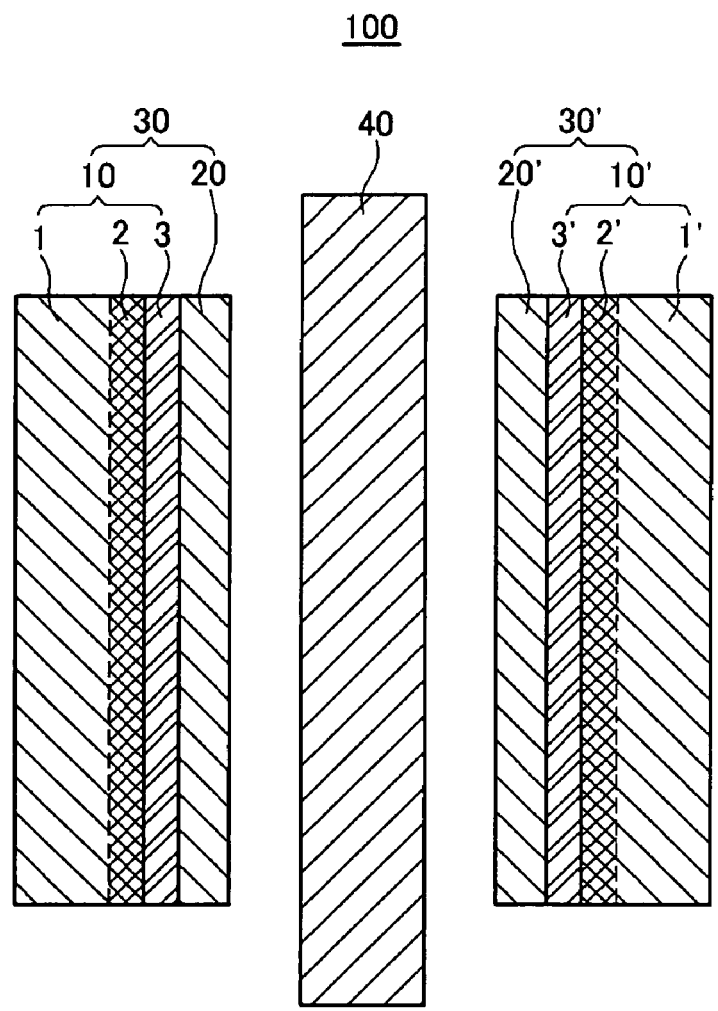
FIG. 2 is a cross-sectional view showing another embodiment of a membrane-electrode assembly for a fuel cell according to the invention.

FIG. 2 is a cross-sectional view of a membrane-electrode assembly for a fuel cell according to another embodiment of the invention. Referring to FIG. 2, the membrane-electrode assembly 100 includes i) a cathode 30 including an electrode substrate 10, which includes a diffusion layer 1, a first microporous layer 2 embedded in the diffusion layer 1, and a second microporous layer 3 formed as a boundary with the diffusion layer 1 thereon, and a catalyst layer 20 formed on the second microporous layer 3; ii) an anode 30' including an electrode substrate 10', which includes a diffusion layer 1', a first microporous layer 2' embedded in the diffusion layer 1', and a second microporous layer 3' formed as a boundary with the diffusion layer 1' thereon, and a catalyst layer 20' formed on the second microporous layer 3'; and iii) a polymer electrolyte membrane 40 for a fuel cell.

In an embodiment, the first microporous layer 2 of the cathode 30 is comparatively more than 10% as thick as the first microporous layer 2' of the anode 30'. In other words, in one embodiment, the first microporous layer 2 of the cathode 30 has a thickness of more than 40% of the entire microporous layer thickness, and in an embodiment, a thickness of 50 to 80% of the entire microporous layer thickness. On the other hand, in an embodiment, the first microporous layer 2' of the anode 30' has a thickness of more than 30% of the entire microporous layer thickness, and in one embodiment, a thickness of 25 to 60% of the entire microporous layer thickness.

In an embodiment, the catalyst layer includes one catalyst selected from the group consisting of platinum, ruthenium, osmium, platinum-ruthenium alloys, platinum-osmium alloys, platinum-palladium alloys, and platinum-M alloys (where M is at least one transition element selected from the group consisting of Ga, Ti, V, Cr, Mn, Fe, Co, Ni, Cu, Zn, and combinations thereof), and in another embodiment, from platinum, ruthenium, osmium, platinum-ruthenium alloys, platinum-osmium alloys, platinum-palladium alloys, platinum-cobalt alloys, and platinum-nickel alloys.

In an embodiment, the catalyst layer can be included in both the anode and the cathode, and can include the same catalyst or a different one in each.

In one embodiment, the polymer electrolyte membrane may include, but is not limited to, at least one proton conductive polymer selected from the group consisting of perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, polyphenylquinoxaline-based polymers, and combinations thereof. In an embodiment, the proton conductive polymer is at least one selected from the group consisting of poly(perfluorosulfonic acid), poly(perfluorocarboxylic acid), copolymers of tetrafluoroethylene and fluorovinylether having a sulfonic acid group, defluorinated polyetherketone sulfides, aryl ketones, poly(2,2'-(m-phenylene)-5,5'-bibenzimidazole), poly (2,5-benzimidazole), and combinations thereof.

The following examples illustrate embodiments of the invention in more detail. However, it is understood that the invention is not limited by these examples.

EXAMPLE 1

10 parts by weight of a carbon black powder, 3.3 parts by weight of poly(tetrafluoroethylene), and 40 parts by weight of isopropyl alcohol were mixed to prepare a coating composition with a viscosity of 2000 cps. The prepared coating composition was coated on one side of a 280 µm-thick carbon paper by screen coating. Herein, the composition was coated to be entirely in a range of 40 to 50 µm thick, and the composition embedded into the carbon paper was about 15 µm thick.

The carbon paper coated with the composition was fired at 350° C. to form an electrode substrate for a fuel cell.

EXAMPLE 2

An electrode substrate was fabricated according to the method in Example 1, except that a composition embedded into a carbon paper was regulated to be 10 µm thick.

EXAMPLE 3

An electrode substrate was fabricated according to the method in Example 1, except that a composition embedded into a carbon paper was regulated to be 30 µm thick by coating the composition on one side of a carbon paper by screen coating and forming a vacuum on the other side of the carbon paper.

COMPARATIVE EXAMPLE 1

20 parts by weight of a carbon black powder, 6.6 parts by weight of poly(tetrafluoroethylene), and 40 parts by weight of isopropyl alcohol were mixed to prepare a coating composition.

The prepared coating composition was coated on the surface of a carbon paper, but was prohibited from embedding into the carbon paper.

COMPARATIVE EXAMPLE 2

A 280 µm-thick carbon paper having no microporous layer was used as an electrode substrate. The reactant-diffusion performance and electron-conducting performance of electrode substrates according to Examples 1 to 3 and Comparative Examples 1 and 2 were measured, and the mass transferring resistances of interfaces of the electrode substrates were measured. The measurement results of Examples 1 and 3 and Comparative Example 1 are provided in FIG. 3.

Figure 3:
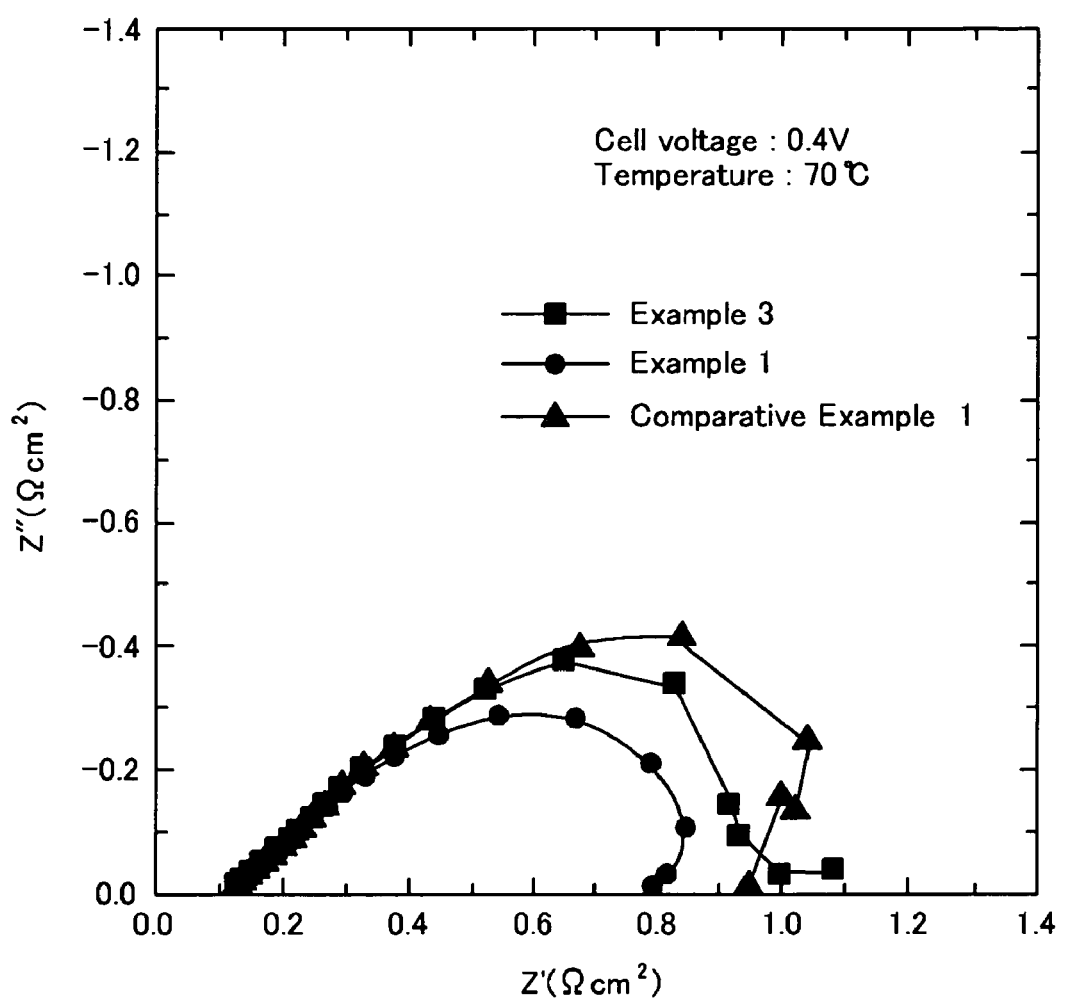
FIG. 3 is a graph showing mass conducting resistance on the interface of an electrode substrate according to Examples 1 and 3 and Comparative Example 1.

Referring to FIG. 3, Z' in the X axis indicates actual impedance, while Z" indicates theoretical impedance As shown in FIG. 3, the electrode substrate according to Comparative Example 1 is represented as a larger semicircle against the X axis than those of the electrode substrates according to Examples 1 and 3, which means it has greater interface resistances, while Example 1 is represented as the smallest semicircle, and thereby has the lowest interface resistances.

EXAMPLE 4

5g of a platinum catalyst (20 wt% of platinum) supported in carbon and 1.5 g of a poly(perfluorosulfonic acid) solution (a NAFIONTM solution, DuPont Co.) were mixed to prepare a catalyst slurry. The catalyst slurry was coated on the surface of a microporous layer of an electrode substrate, and then dried to fabricate a cathode and an anode.

The cathode and anode were disposed at both sides of a poly(perfluorosulfonic acid) electrolyte membrane (NAFION™, DuPont Co) to prepare a membrane-electrode assembly.

EXAMPLE 5

A membrane-electrode assembly was prepared according to the method in Example 4, except that the electrode substrate prepared according to Example 2 was used.

EXAMPLE 6

A membrane-electrode assembly was prepared according to the method in Example 4, except that the electrode substrate prepared according to Example 3 was used.

COMPARATIVE EXAMPLE 3

A membrane-electrode assembly was prepared according to method in Example 4, except that the electrode substrate prepared according to Comparative Example 1 was used.

COMPARATIVE EXAMPLE 4

A membrane-electrode assembly was prepared in the same method as in Example 4, except that carbon paper according to Comparative Example 2 was used.

Then, fuel cells were fabricated by disposing separators at both sides of the membrane-electrode assemblies according to Examples 4 to 6 and Comparative Examples 3 and 4, and the voltage-current characteristics thereof were measured. The results are provided in FIG. 4.

Figure 4:
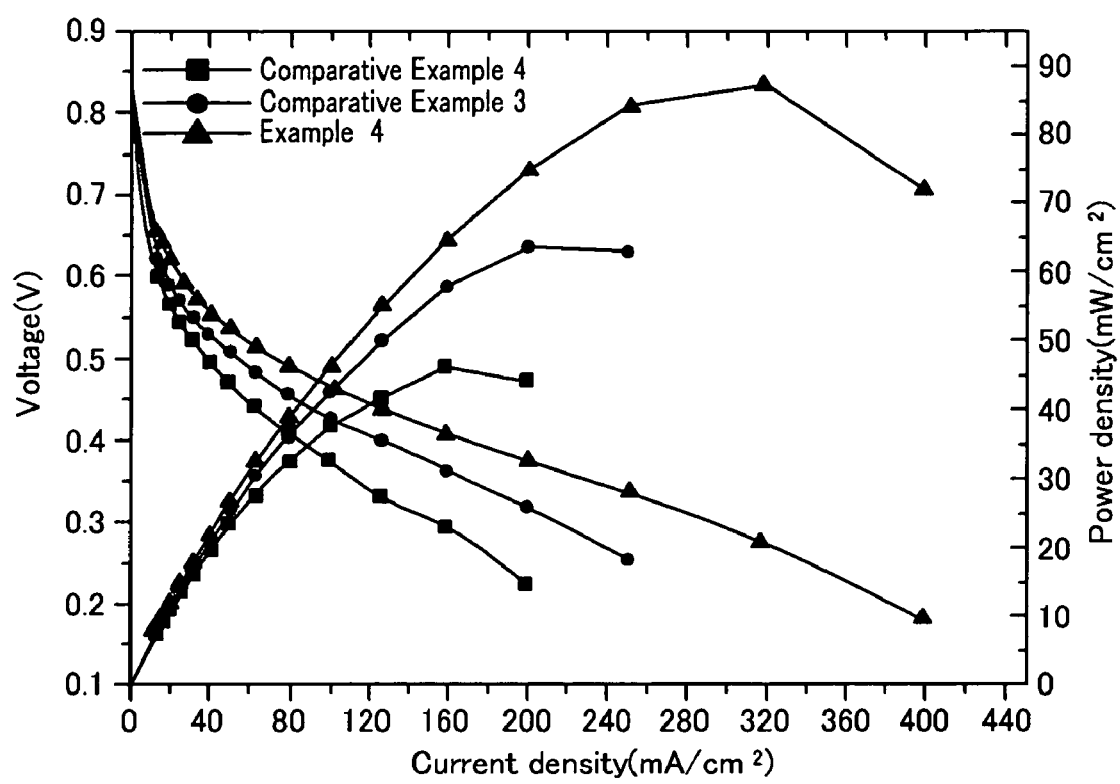
FIG. 4 is a graph showing voltage-current characteristics of a fuel cell fabricated by using a membrane-electrode assembly according to Example 4 and Comparative Examples 3 and 4.

As shown in FIG. 4, a fuel cell including an electrode substrate of the invention and fabricated according to Example 4 had more improved voltage-current characteristics than those of Comparative Examples 3 and 4.

Therefore, an electrode substrate for a fuel cell according to the invention has excellent fuel or oxidant diffusion performance, easier moisture eliminating performance, and excellent electron conducting performance.

While this invention has been described in connection with what is considered to be exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. An electrode substrate for a fuel cell, comprising:
   a diffusion layer having a thickness between 200 to 280 μm;
   a first microporous layer that is embedded into the diffusion layer, wherein the first microporous layer includes carbon particles and has a thickness in the range of 10 to 30 μm; and
   a second microporous layer that forms a boundary with the diffusion layer, wherein the second microporous layer includes carbon particles and is on the surface of the embedded first microporous layer, wherein the sum of the thicknesses of the first and second microporous layers is between 20 and 50 μm.

2. The electrode substrate of claim 1, wherein the thickness of the first microporous layer is greater than or equal to about 25% of the sum of the thicknesses of the first and second microporous layers.

3. The electrode substrate of claim 1, wherein the diffusion layer comprises at least one material selected from the group consisting of carbon paper, carbon cloth, carbon felt, metal cloth, and combinations thereof.

4. The electrode substrate of claim 1, wherein the carbon particles of at least one of the first and second microporous layers comprise a carbon material selected from the group consisting of graphite, carbon nanotubes (CNT), fullerene (C60), activated carbon, Vulcan, ketjen black, carbon black, carbon nanohorns, and combinations thereof.

5. The electrode substrate of claim 1, wherein the first and second microporous layers comprise a binder selected from the group consisting of poly(perfluorosulfonic acid), poly(tetrafluoroethylene), fluorinated ethylene-propylene, and combinations thereof.

6. A membrane-electrode assembly comprising:
   an anode comprising
      an anode electrode substrate comprising
         an anode diffusion layer having a thickness between 200 and 280 μm,
         a first anode microporous layer that is embedded into the anode diffusion layer, the first anode microporous layer including carbon particles and having a thickness in the range of 10 to 30 μm, and
         a second anode microporous layer that forms a boundary with the anode diffusion layer, the second anode microporous layer including carbon particles and located on the surface of the embedded first anode microporous layer, wherein the sum of the thicknesses of the first anode microporous layer and the second anode microporous layer is between 20 and 50 μm, and
      an anode catalyst layer provided on the second anode microporous layer;
   a cathode comprising
      a cathode electrode substrate comprising
         a cathode diffusion layer,
         a first cathode microporous layer that is embedded into the cathode diffusion layer, the first cathode microporous layer including carbon particles and having a thickness in the range of 10 to 30 μm, and
         a second cathode microporous layer that forms a boundary with the cathode diffusion layer, the second cathode microporous layer including carbon particles and located on the surface of the embedded first cathode microporous layer, and
      a cathode catalyst layer provided on the second cathode microporous layer; and
   a polymer electrolyte membrane with opposing sides, the polymer electrolyte membrane interposed between the anode and the cathode, with each side of the polymer electrolyte membrane respectively contacting the catalyst layers of the anode and cathode.

7. The membrane-electrode assembly of claim 6, wherein at least one of the anode catalyst layer or the cathode catalyst layer comprises at least one material selected from the group consisting of platinum, ruthenium, osmium, platinum-ruthenium alloys, platinum-osmium alloys, platinum-palladium alloys, platinum-M alloys where M is at least one metal selected from the group consisting of Ga, Ti, V, Cr, Mn, Fe, Co, Ni, Cu, Zn, Sn, Mo, W, Rh, and combinations thereof.

8. The membrane-electrode assembly of claim 6, wherein the polymer electrolyte membrane comprises at least one proton conductive polymer selected from the group consisting of perfluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, polyphenylquinoxaline-based polymers, and combinations thereof.

9. The membrane-electrode assembly of claim 6, wherein the polymer electrolyte membrane comprises at least one proton conductive polymer selected from the group consisting of poly(perfluorosulfonic acid), poly(perfluorocarboxylic acid), copolymers of tetrafluoroethylene and fluorovinylether having a sulfonic acid group, defluorinated polyetherketone sulfides, aryl ketones, poly(2,2'-(m-phenylene)-55-bibenzimidazole), poly(2,5-benzimidazole), and combinations thereof.

10. The membrane-electrode assembly of claim 6, wherein the first anode microporous layer thickness is greater than or equal to about 25% of the sum of the thicknesses of the first and second anode microporous layers, and the first cathode microporous layer thickness is greater than or equal to about 25% of the sum of the thicknesses of the first and second cathode microporous layers.

\* \* \* \* \*